United States Patent [19]
Shichinohe et al.

[11] Patent Number: 5,515,940
[45] Date of Patent: May 14, 1996

[54] POWER UNIT FOR SADDLE TYPE VEHICLE

[75] Inventors: Takashi Shichinohe; Toshio Shimada; Katsuhiko Ito, all of Saitama, Japan

[73] Assignee: Honda Giken Kogyo Kabushiki Kaisha, Tokyo, Japan

[21] Appl. No.: 366,047

[22] Filed: Dec. 29, 1994

[30] Foreign Application Priority Data

Dec. 29, 1993 [JP] Japan .................................. 5-353963

[51] Int. Cl.$^6$ .................................................. B60K 17/22
[52] U.S. Cl. ........................ 180/376; 180/233; 180/292; 74/665 GA
[58] Field of Search ...................................... 180/233, 245, 180/248, 252, 253, 374, 376, 377, 292, 293; 74/665 F, 665 G, 665 GA, 665 GE

[56] References Cited

U.S. PATENT DOCUMENTS

| | | | |
|---|---|---|---|
| 4,666,015 | 5/1987 | Matsuda et al. | 180/233 |
| 4,699,234 | 10/1987 | Shinozaki et al. | 180/233 |
| 4,704,920 | 11/1987 | Kurata | 180/233 X |
| 4,714,126 | 12/1987 | Shinozaki et al. | 180/233 |
| 4,719,819 | 1/1988 | Tsutsumikoshi et al. | 180/233 X |

FOREIGN PATENT DOCUMENTS

| | | | |
|---|---|---|---|
| 62-110528 | 5/1987 | Japan | 180/233 |
| 63-46250 | 9/1988 | Japan. | |

Primary Examiner—Kevin T. Hurley

[57] ABSTRACT

A casing of a power unit is formed which is capable of simultaneously driving the front and the rear wheels of a saddle type vehicle. The power unit includes an engine and a transmission in a compact construction. A crankshaft, a main shaft, a secondary shaft and an output shaft are supported in parallel to the longitudinal axis of the vehicle in a casing for both an engine and a transmission. The crankshaft, the main shaft and the secondary shaft are arranged on substantially the same level. The output shaft is disposed below the main shaft and the secondary shaft. The opposite ends of the output shaft project outside from the casing. The opposite ends of the output shaft are connected to a front driving shaft and a rear driving shaft, respectively.

24 Claims, 15 Drawing Sheets

POWER UNIT FOR SADDLE TYPE VEHICLE

BACKGROUND OF THE INVENTION

1. Field of the Invention

The present invention relates to a power unit for a saddle type vehicle. More particularly, the invention relates to improvements in a power unit for driving the front wheels and the rear wheels of a saddle type vehicle which includes a crankshaft of an engine, a main shaft, a secondary shaft and an output shaft of a transmission, and a casing joined to the lower end of the cylinder block of the engine and supporting the crankshaft. The main shaft, the secondary shaft and the output shaft are disposed in parallel to the longitudinal axis of the vehicle and positioned below a saddle type seat. 2. Description of Background Art A power unit of the aforesaid type is disclosed in, for example, Japanese Patent Publication (Kokoku) No. 63-46250.

When the main shaft, the secondary shaft and the output shaft extend in parallel to the crankshaft disposed longitudinally of the vehicle as mentioned above, the transmission gears may be spur gears and the front driving shaft and the rear driving shaft for driving the front wheels and the rear wheels, respectively, can be coupled directly with the secondary shaft or the output shaft, which is advantageous to the simplification of the construction of the power unit and the improvement of the transmission efficiency.

As described in the aforesaid Japanese patent publication, the crankshaft, the main shaft, the secondary shaft and the output shaft are arranged on substantially the same level, the rear end of the secondary shaft is connected to the rear driving shaft, and the front end of the output shaft is connected to the front driving shaft. The output shaft is driven synchronously through a chain by the secondary shaft. The casing of this power unit can be formed in a comparatively flat shape having a small height, the overall height of the power unit is small and the center of gravity can be lowered. On the other hand, since the shafts are arranged laterally of the vehicle, the casing has a comparatively large width and, inevitably, the space between the right and the left step is increased.

SUMMARY AND OBJECTS OF THE INVENTION

The present invention was developed in view of such problems and it is therefore an object of the present invention to provide a compact power unit having the least possible overall height with a casing having a reduced width to enable the steps to be disposed with a reduced space therebetween and capable of securing a low center of gravity.

With the foregoing object in view, the present invention arranges a crankshaft, a main shaft and a secondary shaft on substantially the same level, disposes an output shaft under the main shaft and the secondary shaft with a front end and a rear end thereof projecting from a casing. A front driving shaft for driving front wheels is connected to the front end of the output shaft. A rear driving shaft for driving rear wheels is connected to the rear end of the output shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

A preferred embodiment of the present invention will be described hereinafter with reference to the accompanying drawings.

Figure 1:
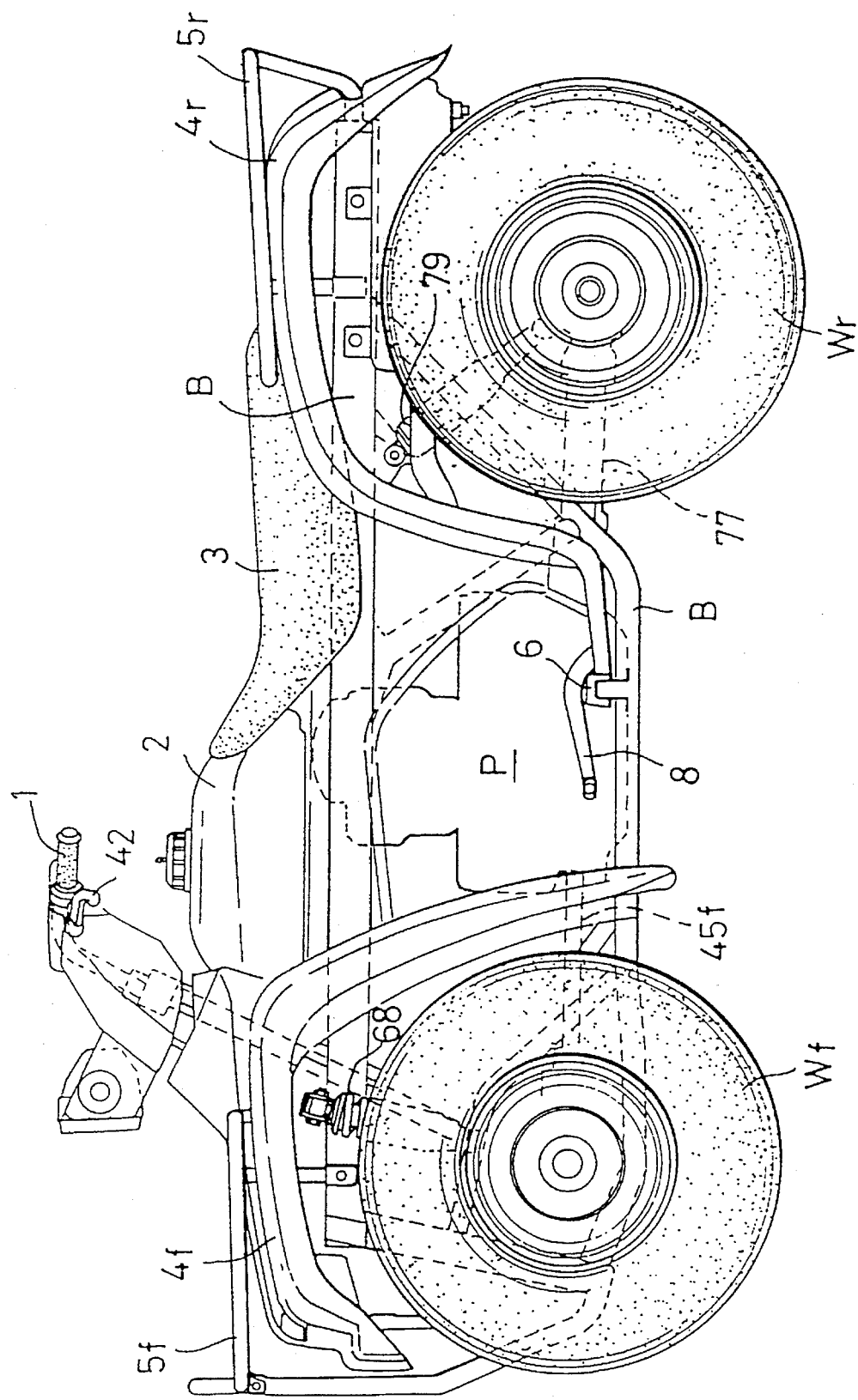
FIG. 1 is an elevational view of a saddle type vehicle.
Figure 2:
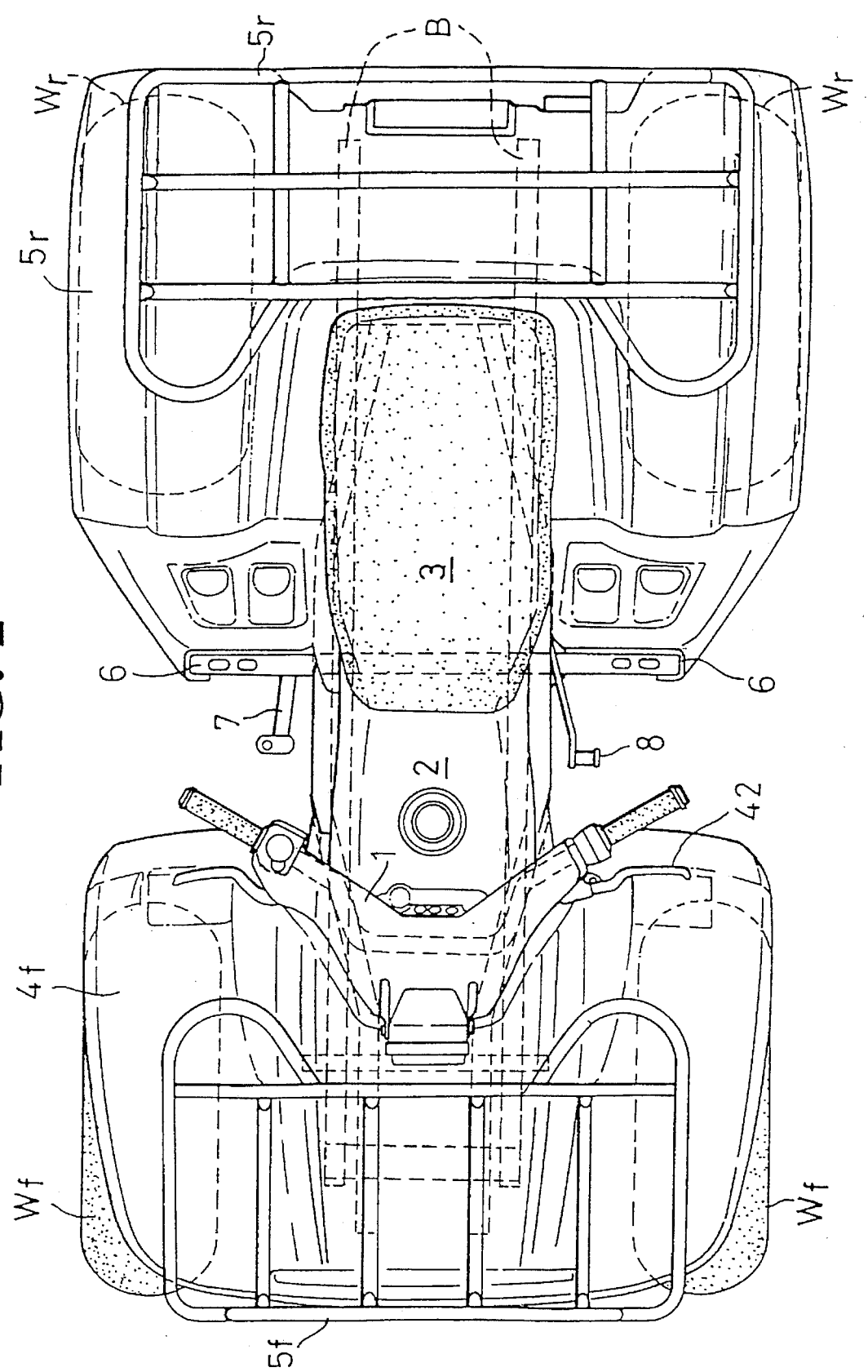
FIG. 2 is a top plan view thereof.

FIGS. 1 and 2 illustrate a saddle type vehicle wherein a pair of front wheels Wf and a pair of rear wheels Wr are suspended on the front end and on the rear end, respectively, of a body frame B. Each of the wheels is provided with a pressurized balloon tire. A steering bar 1, a tank 2 and a saddle type seat 3 are mounted on the body frame B from the front toward the rear. A power unit P for driving the front wheels Wf and the rear wheels Wr is mounted on the body frame B in the middle portion of the front under the tank 2 and the seat 3.

Fenders 4f and 4r are attached to the body frame B so as to substantially cover the upper halves of the front wheels Wf and the rear wheels Wr. Luggage carriers 5f and 5r are placed on the upper surfaces of the fenders.

A pair of steps 6 are fixed to the middle part of the lower portion of the body frame B so as to project laterally outwardly from the power unit P to support the legs of the driver straddling the seat 3. A brake pedal 7 is disposed near the right step 6, and a shift pedal 8 is disposed near the left step 6.

Figure 3:
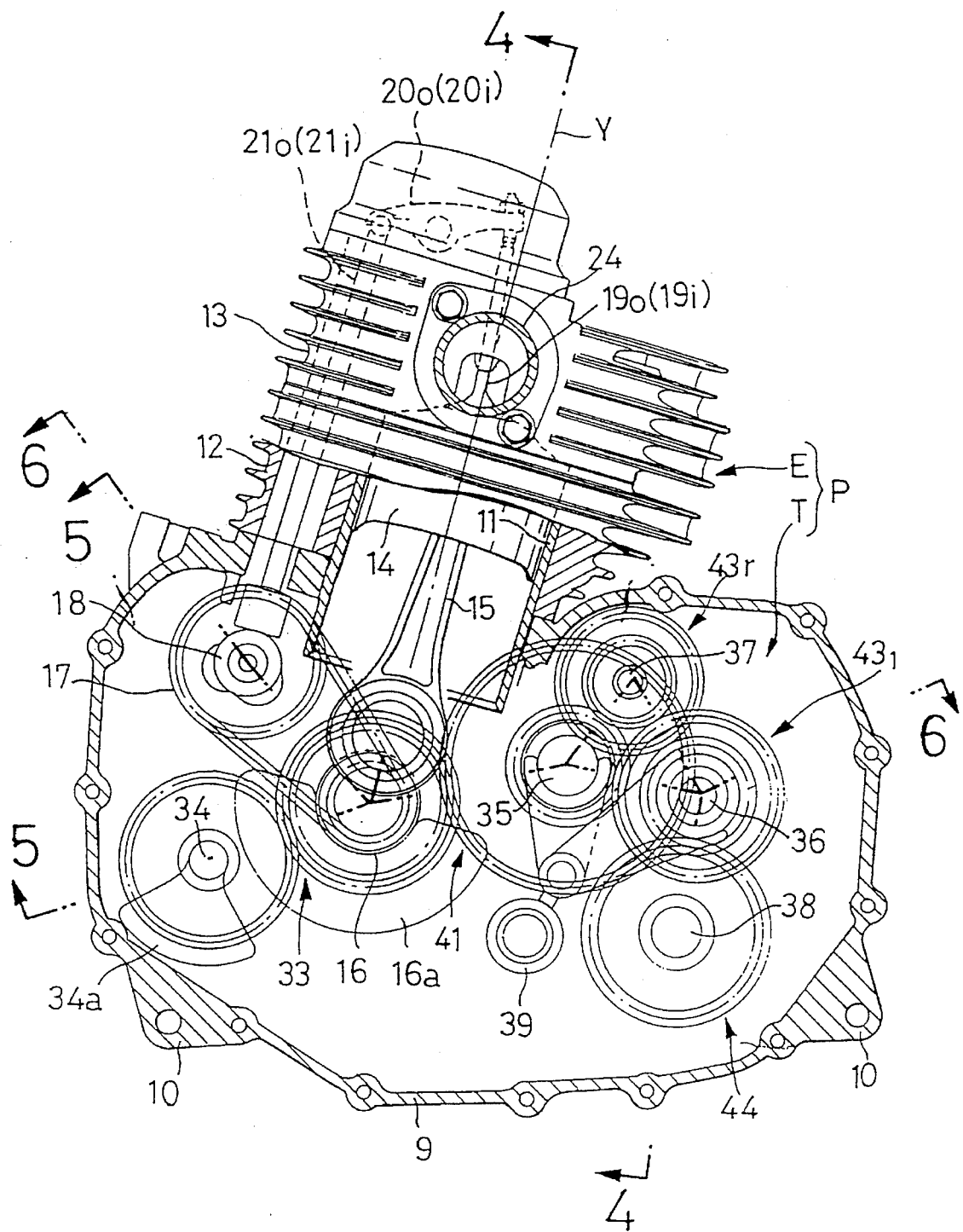
FIG. 3 is a partial cross-sectional view of an essential portion of a power unit included in the saddle type vehicle.
Figure 4:
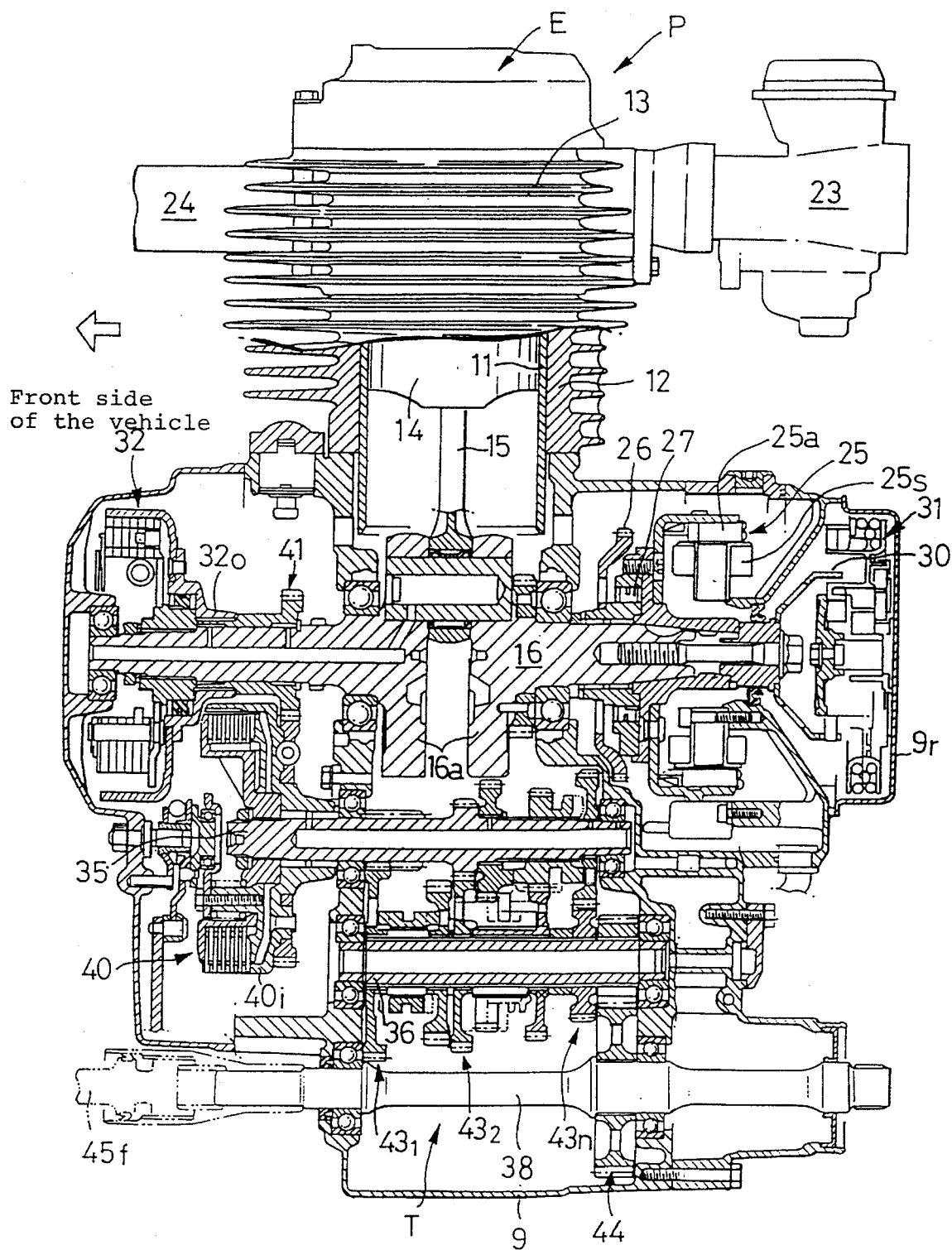
FIG. 4 is a partial sectional view taken along line 4—4 in FIG. 3.

The power unit P is shown in FIGS. 3 to 6. Referring to FIGS. 3 and 4, the power unit P is formed by integrating an engine E and a transmission T. A casing 9 serves as both the crankcase of the engine E and the transmission case of the transmission T. Mounting lugs 10 are formed at the opposite lower ends of the casing 9 and the mounting lugs 10 are joined through elastic mounting members to the body frame B.

The engine comprises a cylinder block 12, a cylinder 11 fitted in the cylinder block 12, a cylinder head 13 joined to the upper end of the cylinder block 12, a piston 14 slidably fitted in the cylinder 11, a crankshaft 16, a connecting rod 15 interconnecting the piston 14 and the crankshaft 16, and a cam shaft 18 driven through a chain 17 by the crankshaft 16 at a reduced rotating speed. The crankshaft 16 and the cam shaft 18 are supported on the casing 9 joined to the lower end of the cylinder block 12. The cylinder head 13 is provided with an intake valve 19i for opening and closing an intake port, an exhaust valve 19o for opening and closing an exhaust port, and rocker arms 20i and 20o for operating the intake valve 19i and the exhaust valve 19o. The cam shaft 18 drives the rocker arms through push rods 21i and 21o.

The engine E includes the crankshaft 16 which extends along the longitudinal axis of the vehicle, the cylinder block 12 is disposed with its cylinder axis Y tilted toward the transmission T disposed on one side of the crankshaft 16, and the cam shaft 18 is disposed on the other side opposite the side in which the cylinder axis Y is tilted on a level above the level on which the crankshaft 16 is disposed.

Figure 6:
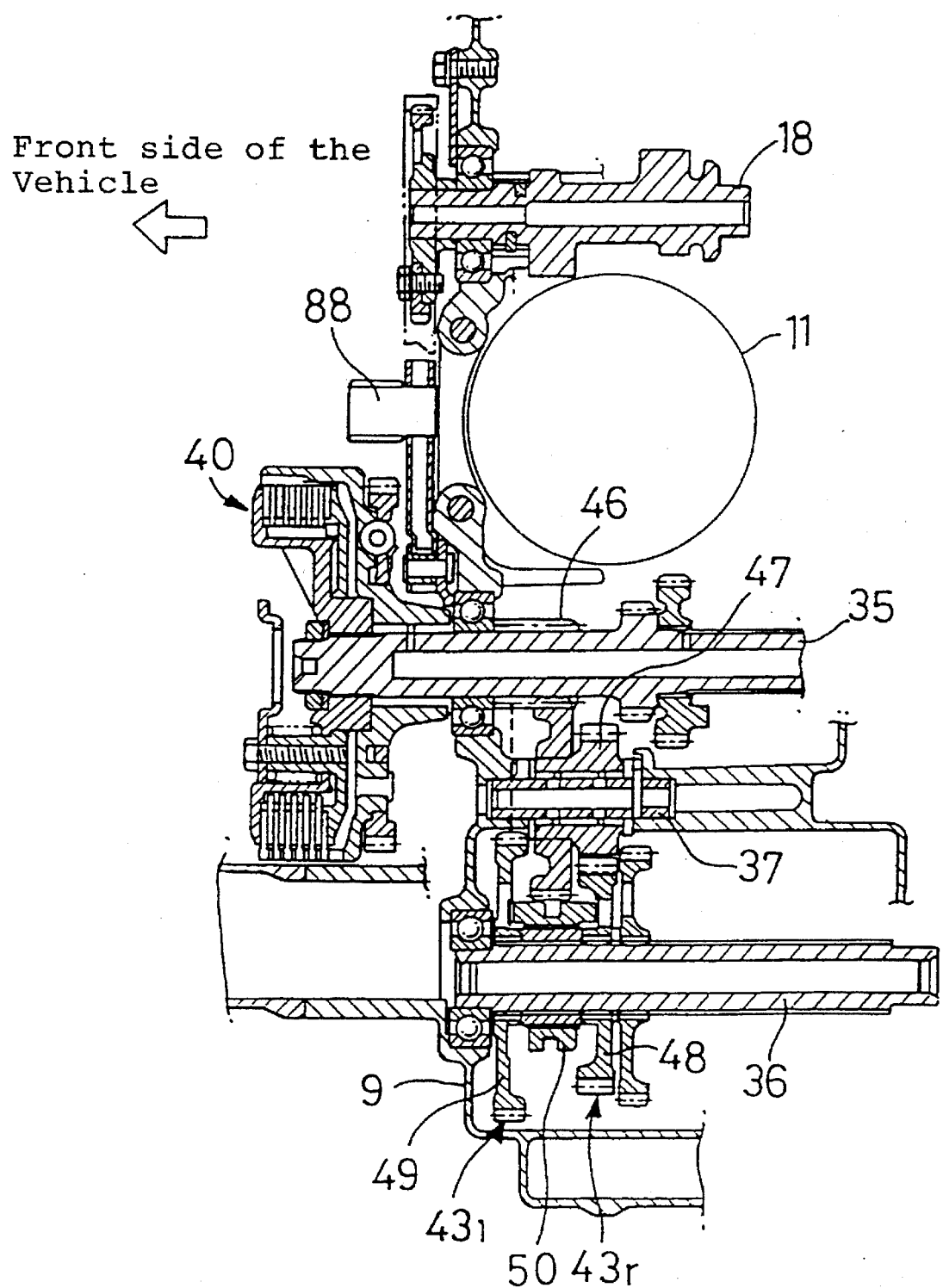
FIG. 6 is a sectional view taken along line 6—6 in FIG. 3.

As illustrated in FIG. 6, the chain 17 extending between the crankshaft 16 and the cam shaft 18 is properly kept taut by a tensioner 88.

An intake passage connected to the intake port opens in the rear wall of the cylinder head 13 and a carburetor 23 is joined to the intake passage connected to the intake port.

An exhaust passage connected to the exhaust port opens in the front wall of the cylinder head 13 and an exhaust pipe 24 is connected to the exhaust passage.

Figure 5:
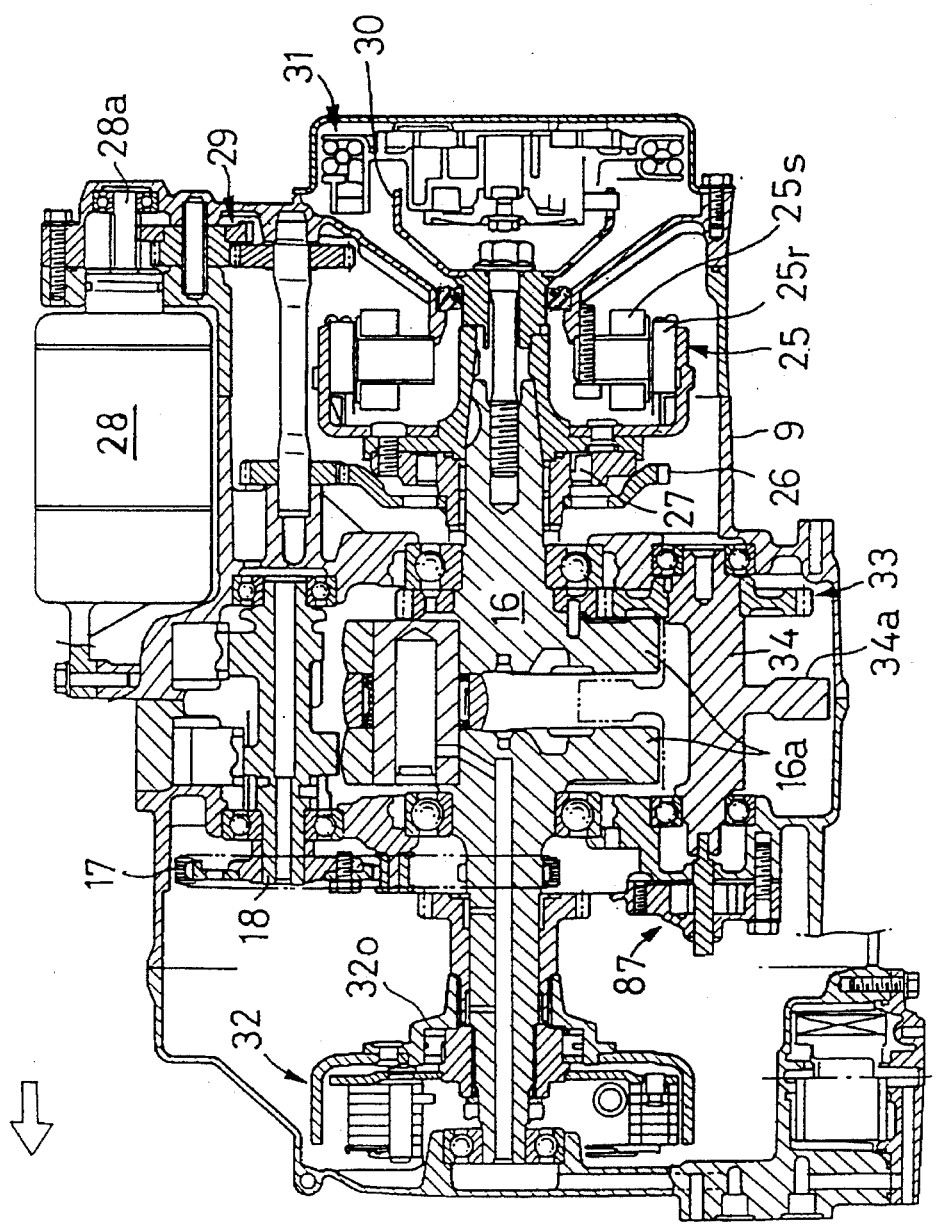
FIG. 5 is a partial sectional view taken along line 5—5 in FIG. 3.

As shown in FIG. 5, the rotor 25r of a generator 25 is fixedly mounted on the rear end of the crankshaft 16, and the stator 25s of the generator 25 is fixed to the rear cover 9r of the casing 9.

A large starting gear 26 is rotatably supported on the crankshaft 16 contiguously with the axial inner end of the rotor 25r and is engaged through an overrunning clutch 27 with the rotor 25r. The starting gear 26 is connected through a reduction gear 29 to the output shaft 28a of a starting motor 28. When the starting motor 28 is actuated to drive the starting gear 26, the crankshaft 16 can be driven for cranking through the overrunning clutch 27 and the rotor 25r. After the engine E has been started, the overrunning clutch 27 allows the rotor 25r to rotate free relative to the starting gear 26.

A starting ring 30 is fixed to the rear end of the crankshaft 16, and a recoil starter 31, capable of being engaged with the starting ring 30 by a pawl, is attached to the rear cover 9r. The crankshaft 16 can be turned for cranking by pulling the rope of the recoil starter 31.

A centrifugal starting clutch 32 is mounted on the front end of the crankshaft 16.

A balancing shaft 34 is supported on the casing 9 below the cam shaft 18. The balancing shaft 34 is driven in the reverse direction through a synchronizing gear train 33 by the crankshaft 16. The balancing shaft 34 is provided in its middle portion with a weight 34a at a position corresponding to a space between a pair of webs 16a of the crankshaft 16. The centrifugal force generated by the weight 34a cancels or reduces the primary vibration of the engine E. A lubricating oil pump 87 is coupled with one end of the balancing shaft 34 so as to be driven by the balancing shaft 34.

Referring to FIGS. 3 to 5, the transmission T has a main shaft 35, a secondary shaft 36, a reverse shaft 37 and an output shaft 38, which are supported on the casing 9 in parallel to the crankshaft 16. The four shafts 35, 36, 37 and 38 are disposed on one side of the crankshaft 16 and the cam shaft 18 and the balancing shaft 34 are disposed on the other side of the crankshaft 16. The main shaft 35 and the secondary shaft 36 are arranged on a level substantially the same as a level along which the crankshaft 16 extends. The reverse shaft 37 is disposed above the main shaft 35 and the secondary shaft 36, and the output shaft 38 is disposed below the main shaft 35 and the secondary shaft 36 and near the secondary shaft 36. A shift drum 39 to be operated by the shift pedal 8 is disposed below the main shaft 35 and at a position nearer to the crankshaft 16 than to the output shaft 38.

A multiple disk transmission clutch 40 is mounted on one end of the main shaft 35. The input member 40i of the transmission clutch 40 and the output member 32o of the starting clutch 32 are interlocked by means of a primary reduction gear 41. The transmission clutch 40 is operated or closed in association with an initial movement of the shift pedal 8.

Multiple gear trains $43_1$ to $43_n$ for interlocking the main shaft 35 and the secondary shaft 36 are arranged between the main shaft 35 and the secondary shaft 36. The secondary shaft 36 and the output shaft 38 are interlocked by a secondary reduction gear 44. The front and the rear ends of the output shaft 38 project from the casing 9 so as to be connected to a front driving shaft 45f and a rear driving shaft 45r.

As shown in FIG. 6, the main shaft 35, the reverse shaft 37 and the secondary shaft 36 are interlocked by a reverse gear train 43r. The reverse gear train 43r comprises a driving gear 46 formed integrally with the main shaft 35, a double idle gear 47 rotatably mounted on the reverse shaft 37, and a driven gear 48 rotatably mounted on the secondary shaft 36 and engaged with the double idle gear 47 engaged with the driving gear 46. A dog clutch body 50 is splined to the secondary shaft 36 between the driven gear 49 of the first speed gear train $43_1$ and the driven gear 48 of the reverse gear train 43r. The first speed gear train $43_1$ transmits power when the dog clutch body 50 and the driven gear 49 are engaged, and the reverse gear train 43r transmits power when the dog clutch body 50 and the driven gear 48 are engaged. The dog clutch body 50 is slidably operated using a left handle lever 42 provided at the steering bar 1.

Figure 7:
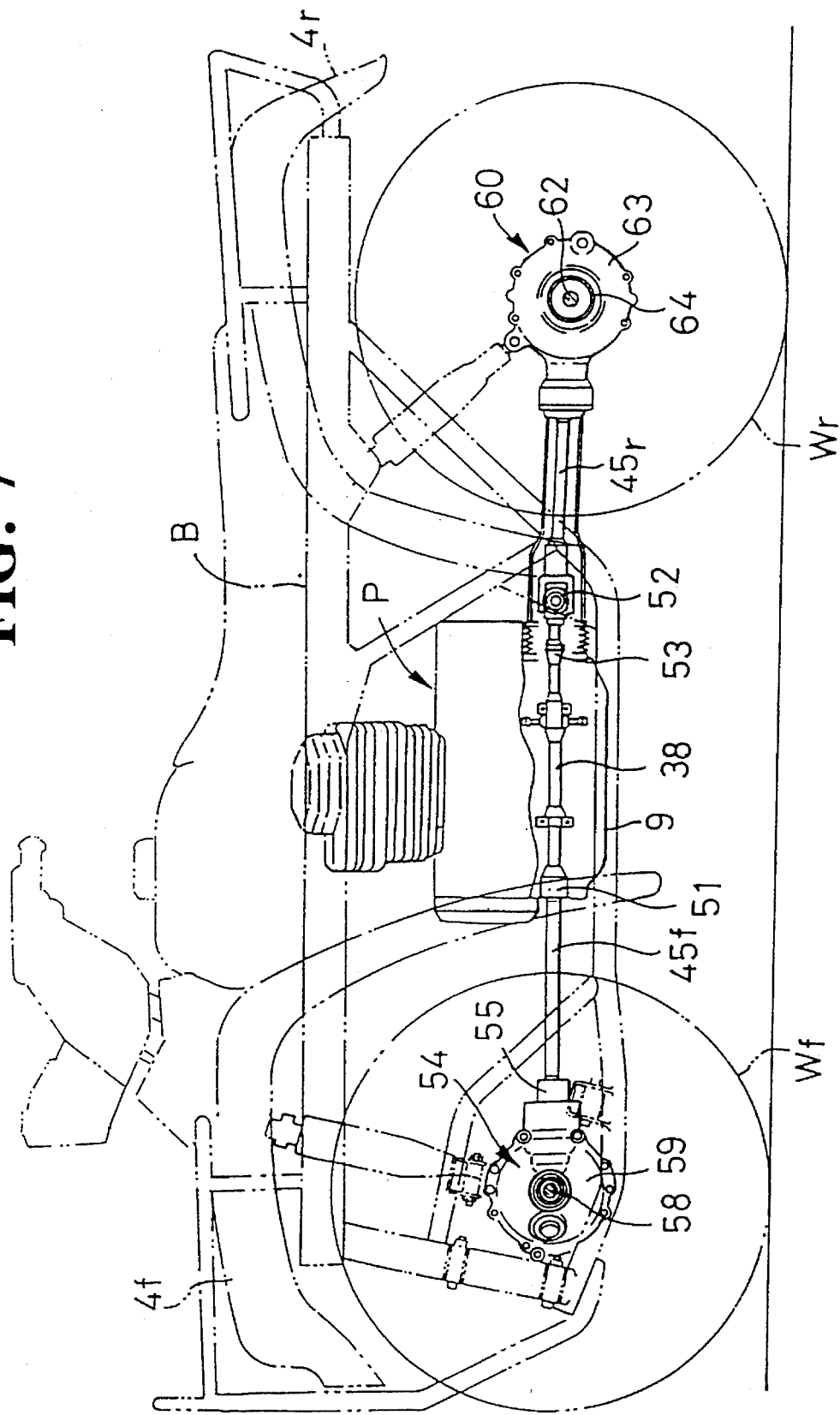
FIG. 7 is a partial cutaway elevational view of the power transmission system of the saddle type vehicle.
Figure 8:
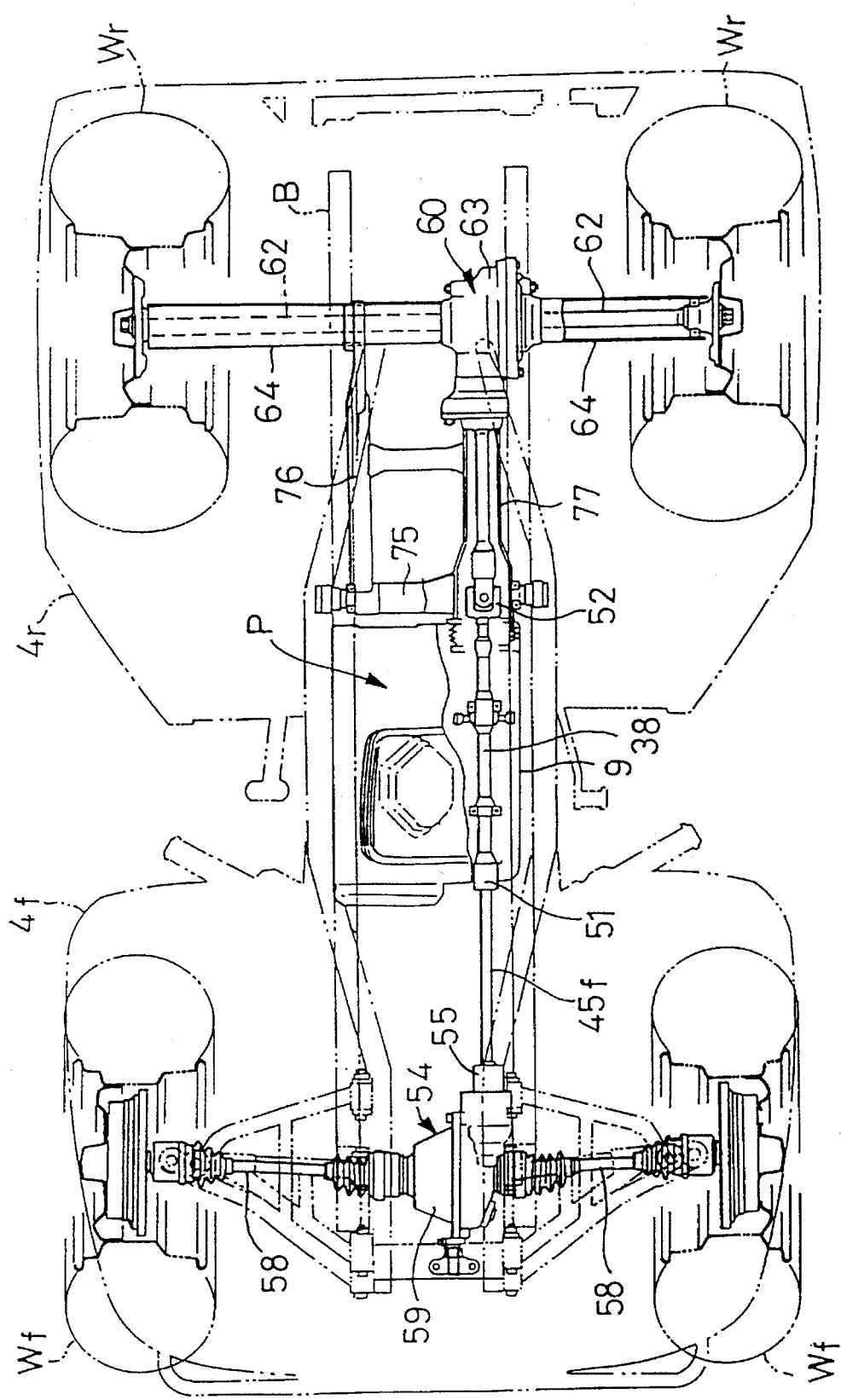
FIG. 8 is a plan view of the power transmission system.

A power transmission system for transmitting power from the output shaft 38 to the front wheels Wf and the rear wheels Wr is shown in FIGS. 7 to 10. Referring to FIGS. 7 and 8, the rear end of a front driving shaft 45f is coupled to the front end of the output shaft 38 by a coupling 51. The front end of a rear driving shaft 45r provided with a Hooke's joint 52 in the middle portion thereof is connected to the rear end of the output shaft 38.

Figure 9:
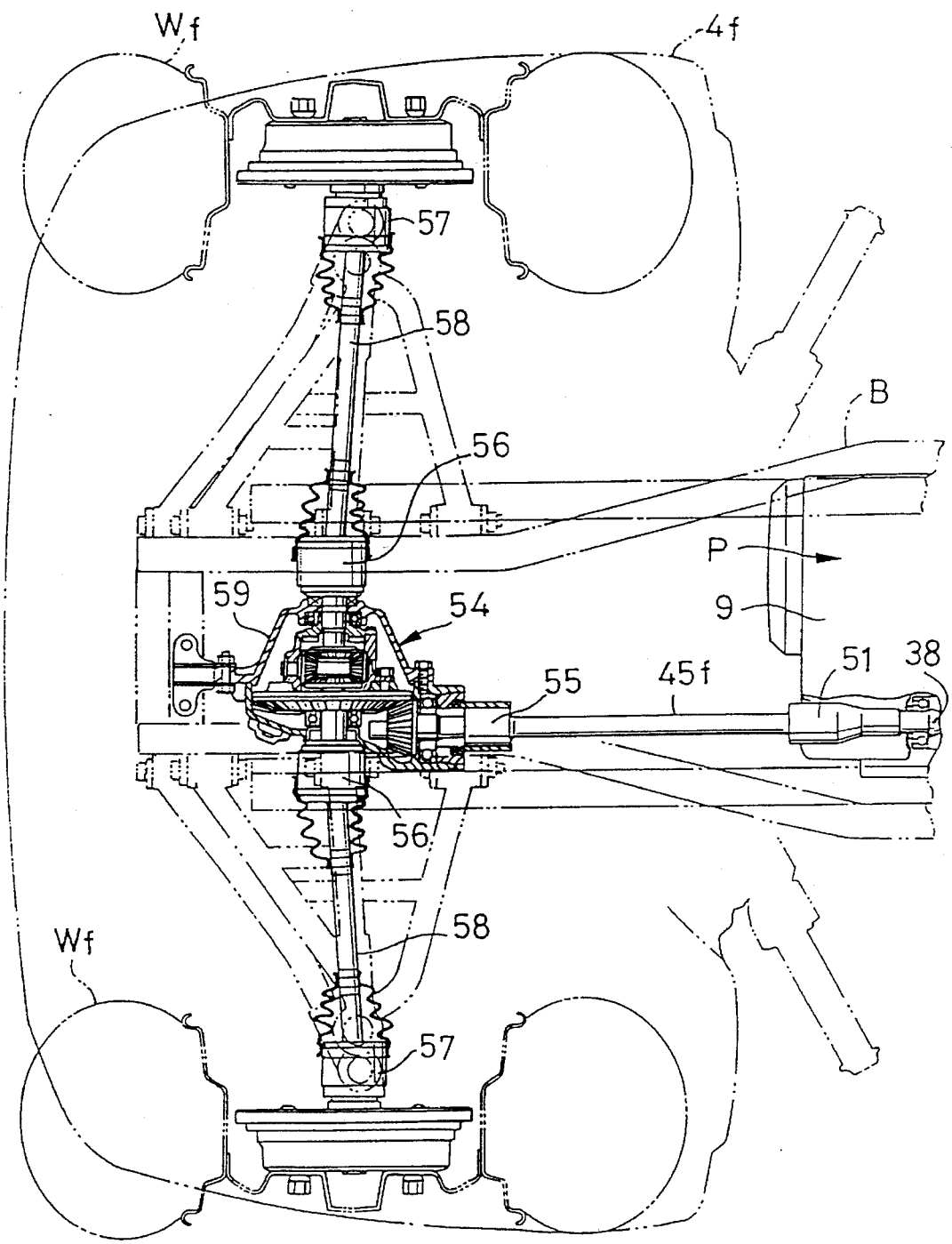
FIG. 9 is a longitudinal sectional view of an essential portion of a front wheel driving unit of the power transmission system.

As shown in FIG. 9, the front end of the front driving shaft 45f is coupled with the input member of a front differential gear 54 by a coupling 55. A front wheel driving shaft 58, provided with constant-velocity joints 56 and 57 at opposite ends, is connected to each of the right and the left output members of the front differential gear 54 and the front wheel Wf is connected to the front wheel driving shaft 58. The differential case 59 of the front differential gear 54 is fixed to the body frame B.

Figure 10:
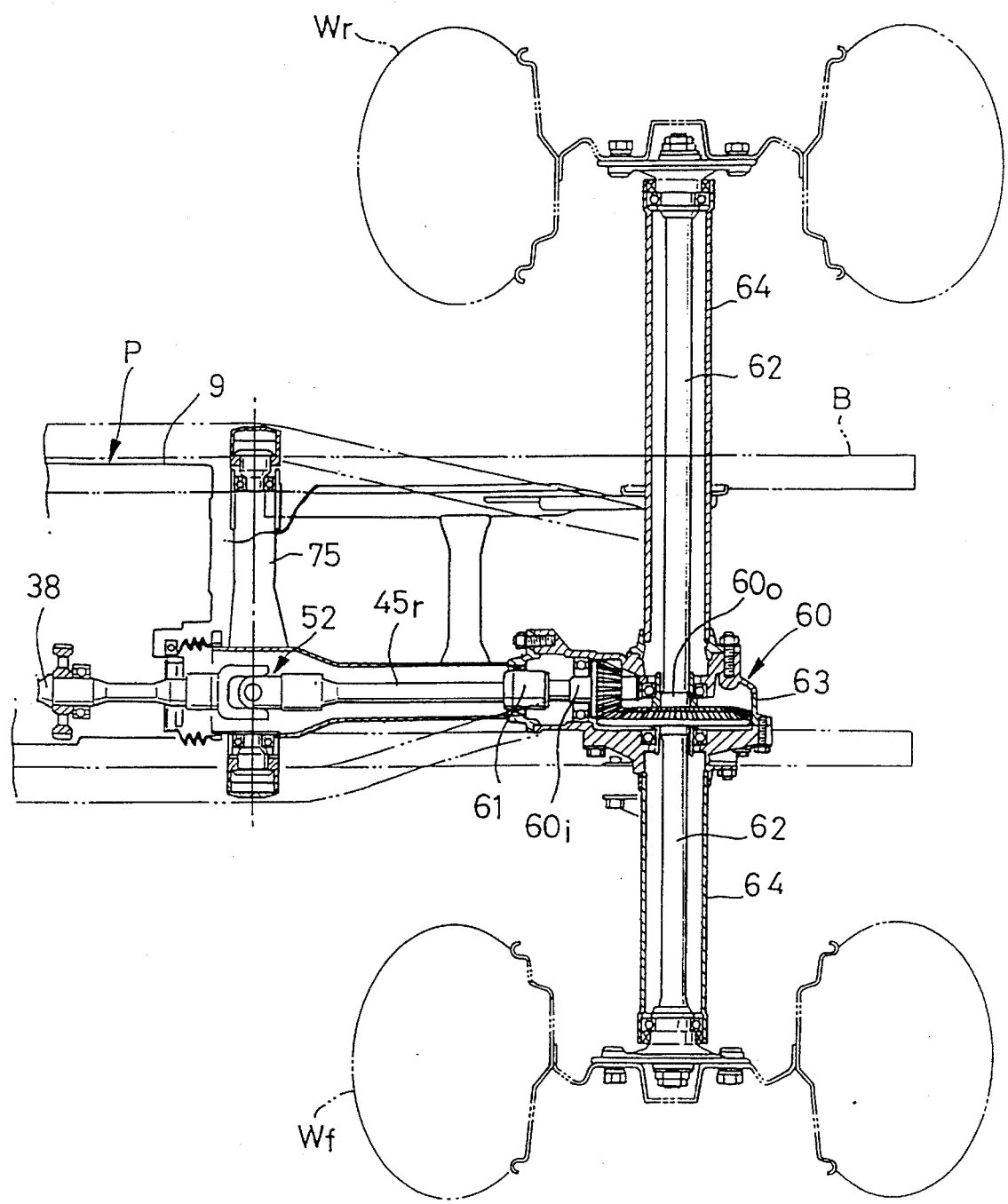
FIG. 10 is a longitudinal sectional view of the rear wheel driving unit of the power transmission system.

As shown in FIG. 10, the rear end of the rear driving shaft 45r is coupled with the input member 60i of a rear wheel driving gear 60 by a coupling 61. A rear wheel driving shaft 62 is connected to the output member 60o of the rear wheel driving gear 60. The rear wheels Wr are connected to the opposite ends of the rear wheel driving shaft 62. The housing 63 of the rear wheel driving gear 60 is fixed to the body frame B, and the axle cases 64 fixedly joined to the opposite sides of the housing 63 support the rear wheel driving shaft 62.

Figure 11:
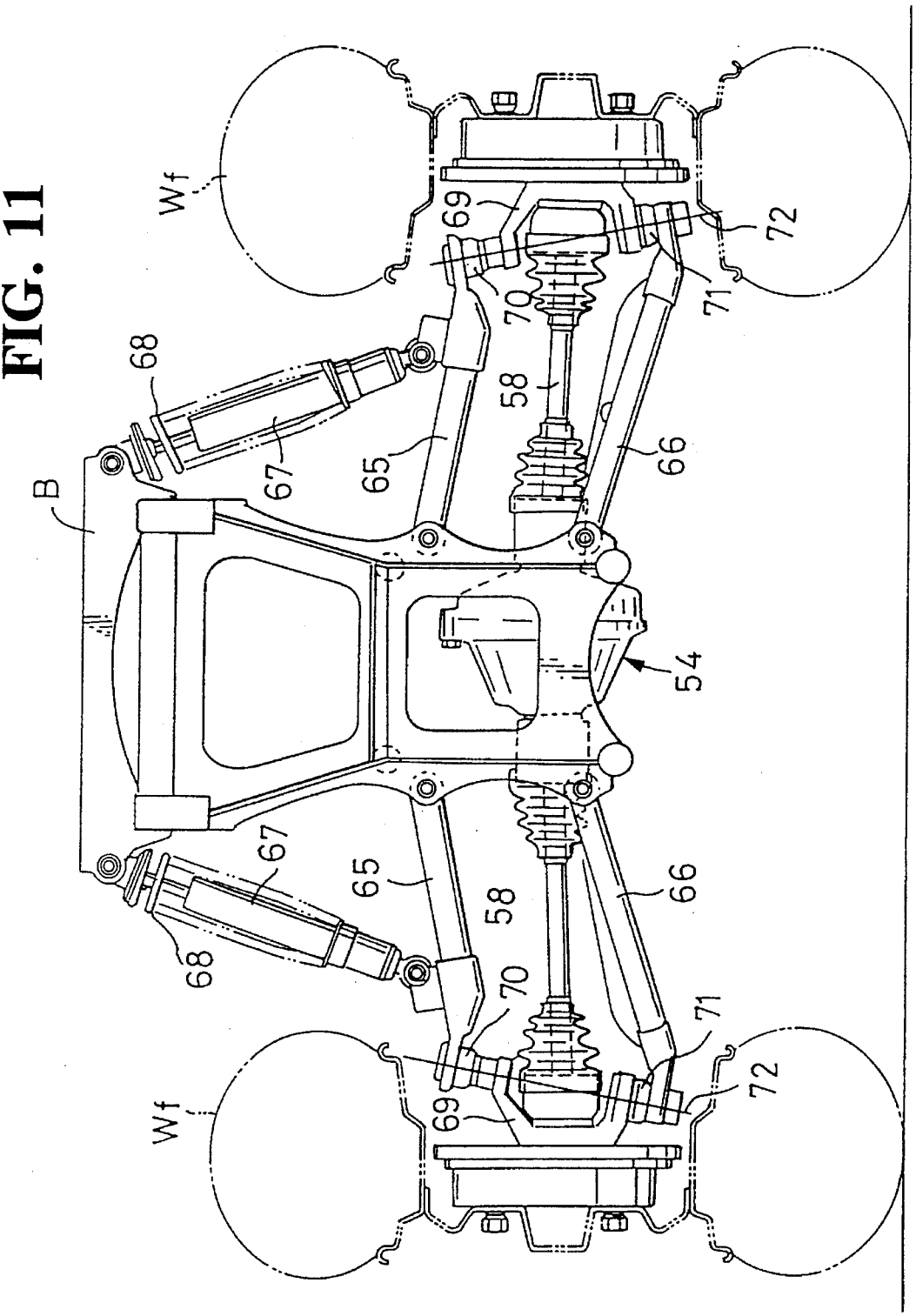
FIG. 11 is a partial cutaway front view of the front suspension of the saddle type vehicle.

FIG. 11 is a partial cutaway front view of a front suspension. The front suspension is symmetrical with respect to a vertical plane including the longitudinal axis of the vehicle. The front suspension comprises a pair of upper arms 65 pivotally supported for swinging motion in a vertical plane on the body frame B, a pair or lower arms 66 pivotally supported for swinging motion in a vertical plane on the body frame B, and a pair of suspension springs 68 combined with dampers 67, respectively, and each extending between the body frame B and the upper arm 65. The outer ends of the upper arms 65 and the lower arms 66 are joined to knuckles 69 by ball joints 70 and 71, respectively.

Each knuckle 69 is provided integrally with a knuckle arm, not shown, connected by a linkage to the steering bar 1. When the steering bar 1 is turned, the knuckle 69 is turned together with the front wheel Wf about an axis 72 extending through the ball joints 70 and 71.

Figure 12:
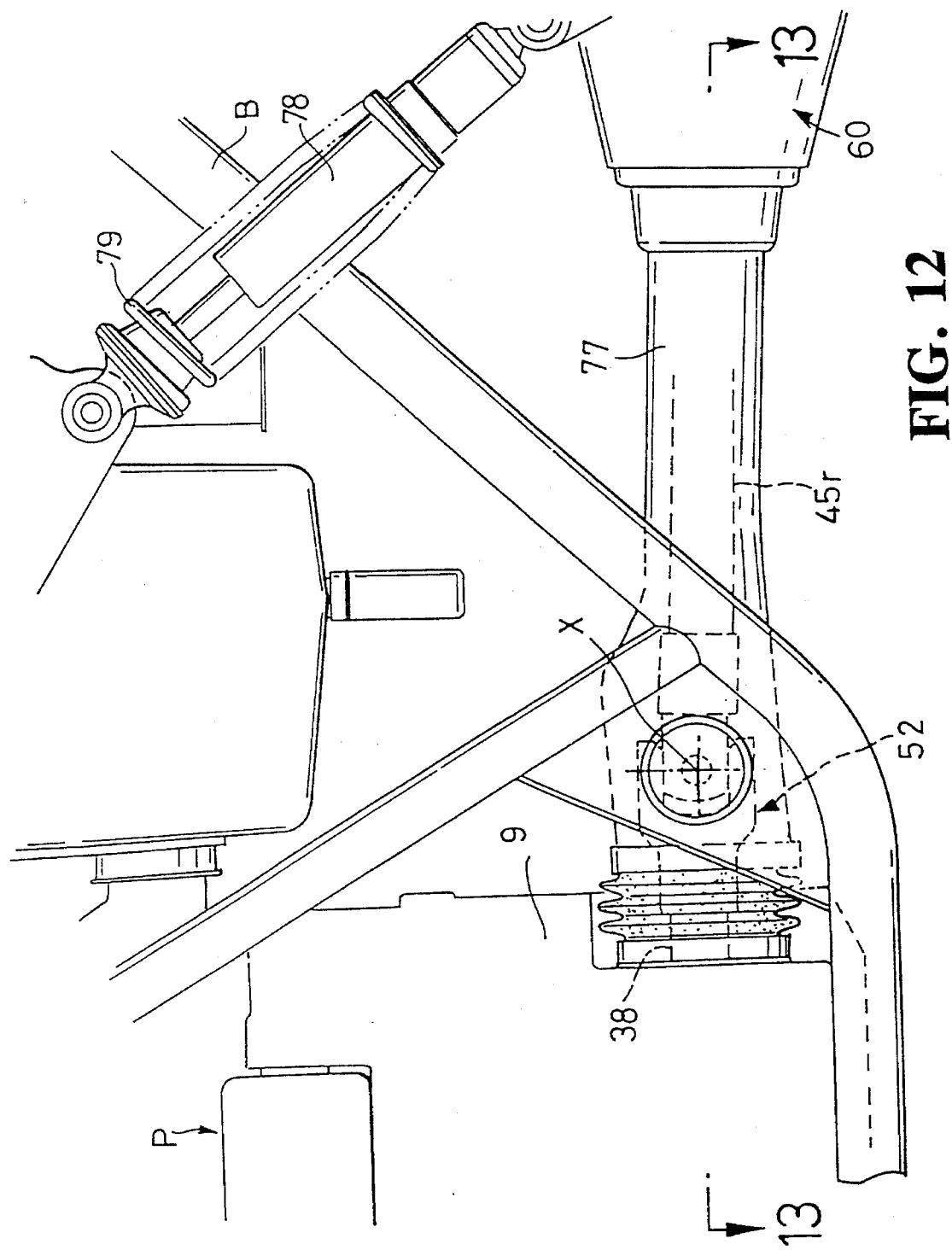
FIG. 12 is a side view of the rear suspension of the saddle type vehicle; 10
Figure 13:
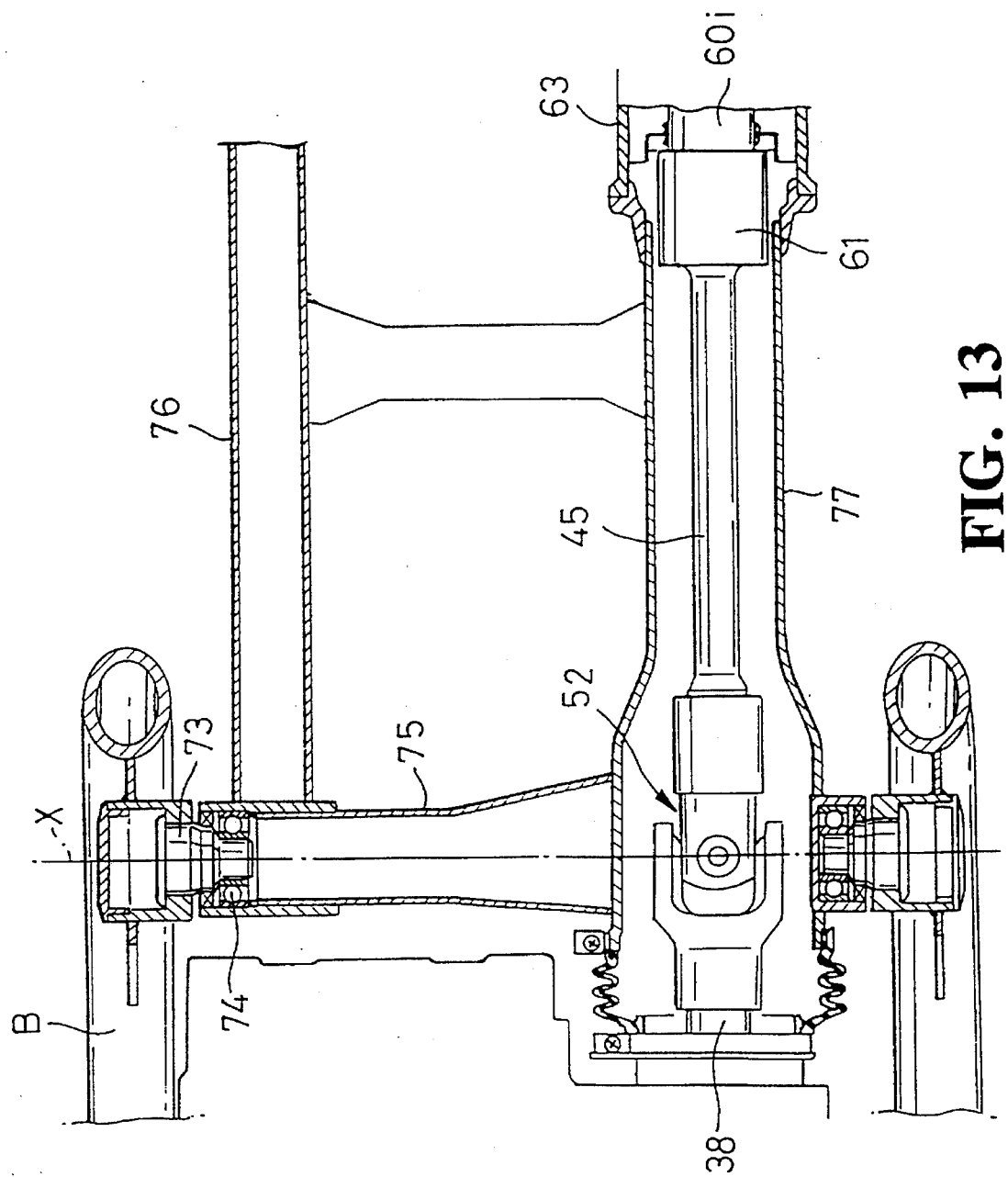
FIG. 13 is a cutaway plan view of the rear suspension.
Figure 14:
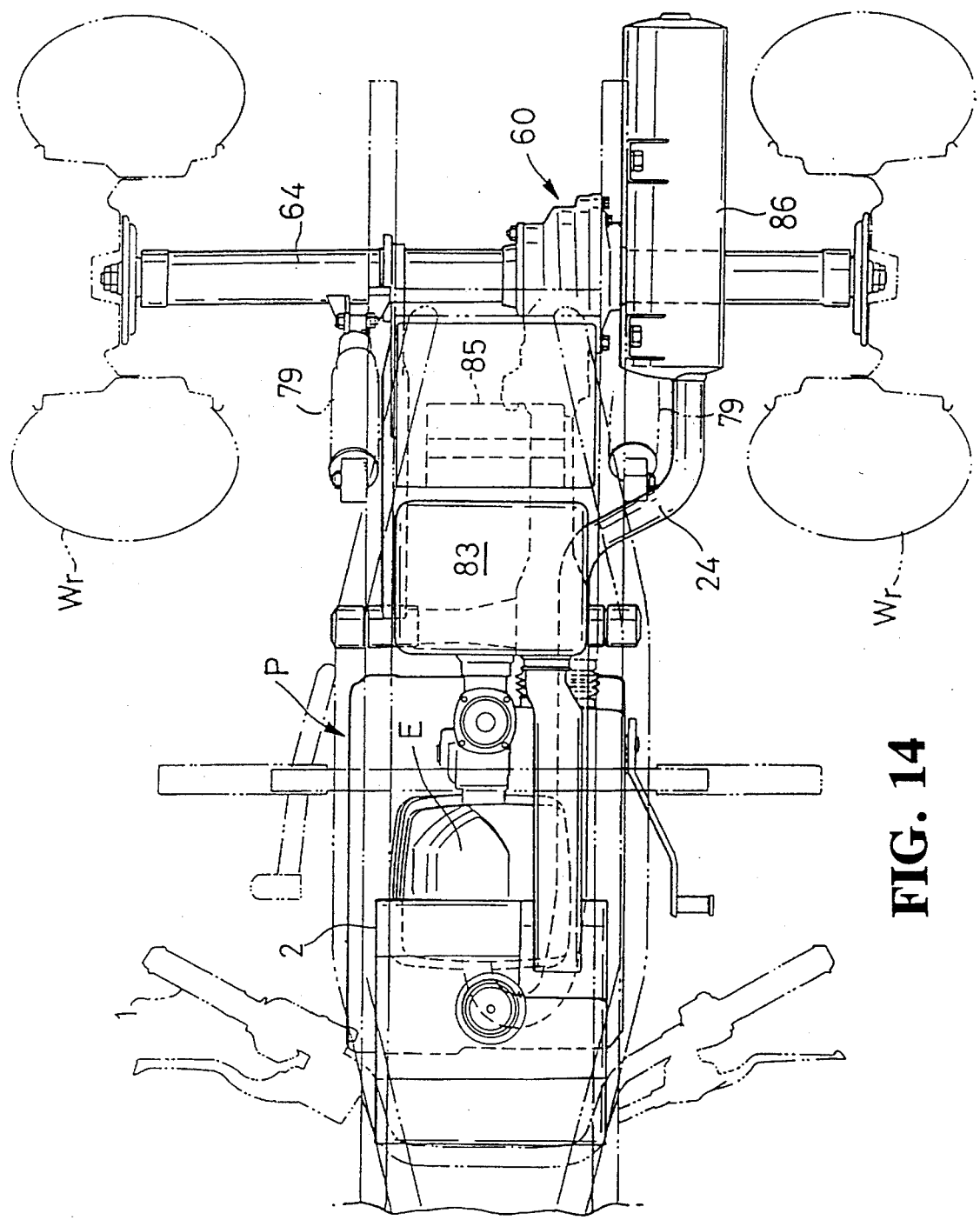
FIG. 14 is a plan view showing the layout of the accessories of the saddle type vehicle.

A rear suspension is shown in FIGS. 12, 13, and 14. The rear suspension comprises right and left pivots 73 fixed to the body frame B. A pivotal pipe 75 is supported at its opposite ends on bearings 74 positioned on the pivots 73. A right arm pipe 76 connects the right end of the pivotal pipe 75 to the axle case 64. A left arm pipe 77 connects the left end of the pivotal pipe 75 to the housing 63. Suspension springs 79 are combined, respectively, with dampers 78 and extend between the housing 63 and the body frame B and between the axle case 64 and the body frame B, respectively. The left arm pipe 77 has a diameter greater than that of the right arm pipe 76, and the rear driving shaft 45r extends through the left arm pipe 77. The Hooke's joint 52 is disposed so that its center of swinging motion is on the axis X of turning of the pivotal pipe 75. When the right and the left arm pipe 76 turn together with the pivotal pipe 75 about the axis X, the rear driving shaft 45r is able to flex at the Hooke's joint 52 and hence power can be transmitted to the rear wheels Wr without any difficulty.

Figure 15:
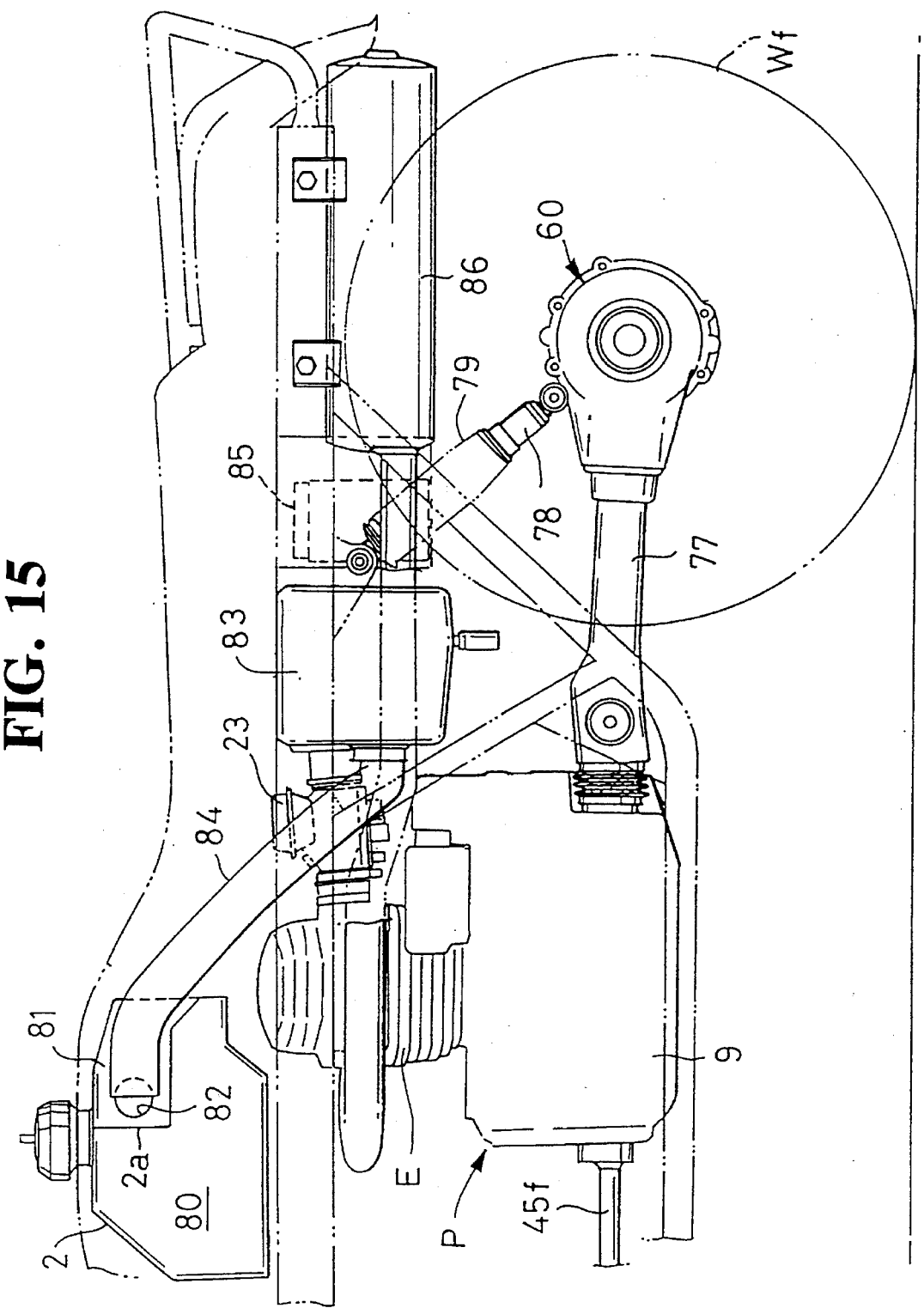
FIG. 15 is a side view showing the layout of the accessories of the saddle type vehicle.

The layout of accessories is shown in FIGS. 14 and 15. The interior of the tank 2 is partitioned by a partition wall 2a into a large fuel chamber 80 and a small intake chamber 81. Fuel to be supplied to the carburetor 23 of the engine E is contained in the fuel chamber 80. An air inlet opening 82 is formed in the side wall of the intake chamber 81. The intake chamber 81 is connected to an air cleaner 83 joined to the inlet end of the carburetor 23 by an intake duct 84. Since the intake chamber 81 is on a level above the air cleaner 83, comparatively clean air can be supplied to the air cleaner 83 even when the vehicle travels on rough ground to suppress the contamination of the air cleaner 83 to the least extent. The intake chamber 81 serves also as means for reducing the suction noise of the engine E.

A battery 85 is disposed behind the air cleaner 83, and a muffler 86, connected to the exhaust pipe 24, extends behind the battery 85.

The operation of this embodiment will be described hereinafter. Referring to FIG. 4, the crankshaft 16 rotates at a low rotating speed and the centrifugal starting clutch 32 remains disengaged while the engine E is idling, so that power is not transmitted from the crankshaft 16 to the transmission clutch 40.

When the first speed gear train $43_1$ of the transmission T is engaged and the output of the engine E is increased to start the vehicle, the starting clutch 32 is engaged automatically as the rotating speed of the crankshaft 16 increases, and the output torque of the crankshaft 16 is transmitted through the starting clutch 32, the primary reduction gear 41 and the transmission clutch 40 to the main shaft 35, the torque of the main shaft 35 is transmitted through the first speed gear train $43_1$, the secondary shaft 36 and the secondary reduction gear 44 to the output shaft 38 to drive the output shaft 38. Since the output shaft 38 drives both the front driving shaft 45f and the rear driving shaft 45r simultaneously, the front wheels Wf and the rear wheels Wr are driven by the front driving shaft 45f and the rear driving shaft 45r and, consequently, the vehicle starts traveling.

The transmission clutch 40 is disengaged when changing the transmission gear ratio by selectively engaging the speed gear trains $43_1$ to $43n$ while the vehicle is traveling to enable a smooth transmission gear ratio changing operation.

Incidentally, as mentioned above with reference to FIG. 3, the main shaft 35 and the secondary shaft 36 of the transmission T are arranged on substantially the same level as that on which the crankshaft 16 is placed, the output shaft 38 is disposed below the main shaft 35 and the secondary shaft 36, and the reverse shaft 37 is disposed above the main shaft 35 and the secondary shaft 36. Therefore, the width of the casing 9 can be reduced without being interfered with by the output shaft 38 and the reverse shaft 37 and the casing 9 can be formed in a vertically flat shape. Consequently, the power unit P can be formed in a compact construction having a comparatively small overall height and a comparatively small width.

Furthermore, the output shaft 38 can be disposed below the main shaft 35 and the secondary shaft 36 at a sufficiently long distance from the main shaft 35 so that the output shaft 38 can be disposed with the front and the rear end projecting outside from the casing 9 to connect the same to the front driving shaft 45f and the rear driving shaft 45r without being interfered with by the transmission clutch 40 mounted on the main shaft 35 and having a large diameter. Since the front driving shaft 45f and the rear driving shaft 45r are driven by the single output shaft 38, the power transmission system has a simple configuration.

Still further, since the secondary shaft 36 and the output shaft 38 are interlocked by the secondary reduction gear 44, the gear ratios of the multiple reduction gear trains $43_1$ to $43n$ can be reasonably determined.

Since the cylinder block 12 of the engine E is tilted toward the transmission T, the overall height of the power unit P is reduced, the center of gravity of the cylinder block 12 and the associated parts is shifted toward the center of the casing 9 and hence the weight of the power unit P can be easily and evenly distributed to the right and the left members of the body frame B.

Many changes in design may be made in the foregoing embodiment without departing from the gist of the present invention. For example, when the power unit P is to be used on a light vehicle that can be moved backward by human power, the reverse shaft 37 and the reverse gear train 43r may be omitted. The vehicle may be a three-wheel vehicle with either a single front wheel Wf or a single rear wheel Wr or may be a two-wheel vehicle with a single front wheel Wf and a single rear wheel Wr.

As is apparent from the foregoing description, according to the present invention, the crankshaft, the main shaft and the secondary shaft are arranged on substantially the same level, the output shaft is disposed with the front and the rear end thereof projecting outside from the casing below the main shaft and the secondary shaft. The front driving shaft for driving the front wheels is connected to the front end of the output shaft. The rear driving shaft for driving the rear wheels is connected to the rear end of the output shaft. Therefore, the casing has a comparatively narrow width and a vertically flat shape. Accordingly, the power unit has a small overall height and a small width, the center of gravity of the vehicle is at a low position, the width of the space between the steps can be reduced and hence the riding comfort can be improved. Furthermore, since the front and the rear driving shaft are driven by the single output shaft, the power transmission system has a simple configuration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit comprising:
   an engine including a crankshaft, a main shaft, a secondary shaft and an output shaft being operatively arranged relative to each other;
   a casing joined to a lower end of a cylinder block of the engine for supporting the crankshaft, the main shaft, the secondary shaft and the output shaft in a parallel arrangement;
   wherein the crankshaft, the main shaft and the secondary shaft are arranged on substantially the same level,
   wherein the output shaft is disposed under the main shaft and the secondary shaft, and
   wherein the output shaft includes a front end and a rear end projecting from the casing.

2. The power unit of claim 1, and further including a reverse shaft disposed on a first side of the crankshaft together with said main shaft, the secondary shaft and said output shaft.

3. The power unit of claim 2, and further including a cam shaft disposed on a second side of said crankshaft.

4. The power unit of claim 3, and further including a balancing shaft disposed on said second side of said crankshaft in a substantially parallel arrangement relative to said cam shaft.

5. The power unit of claim 3, and further including a chain operatively connected to said crankshaft and said cam shaft for imparting rotation thereto.

6. The power unit of claim 5, and further including a tensioner for maintaining a predetermined tension on said chain.

7. The power unit of claim 4, and further including a synchronizing gear train operatively connected to said crankshaft for driving said balancing shaft in a reverse direction relative to a direction of rotation of said crankshaft.

8. The power unit of claim 1, and further including:
   a front drive shaft connected to the front end of the output shaft, and
   a coupling for connecting said front drive shaft to said front end of the output shaft.

9. The power unit of claim 1, and further including:
   a rear drive shaft connected to the rear end of the output shaft, and
   a joint connection for connecting said rear drive shaft to said rear end of said output shaft.

10. The power unit according to claim 1, wherein the engine has a cylinder axis tilted toward the transmission.

11. A vehicle comprising:
    a front wheel;
    a rear wheel;
    a frame;
    a power unit including:
       an engine and a transmission being integrated into said power unit, said engine having a cylinder block mounted to said frame and including a crankshaft, a main shaft, a secondary shaft and an output shaft being operatively arranged relative to each other;
       a casing joined to a lower end of said cylinder block of said engine for supporting the crankshaft, the main shaft, the secondary shaft and the output shaft in a substantially parallel arrangement relative to a longitudinal axis of the vehicle;
       wherein the crankshaft, the main shaft and the secondary shaft are arranged on substantially the same level;
       wherein the output shaft is displaced relative to said main shaft and is disposed under the main shaft and the secondary shaft;
       wherein the output shaft includes a front end and a rear end projecting from the casing;
    a front drive shaft operatively connected to the front end of the output shaft for driving the front wheel; and
    a rear drive shaft operatively connected to the rear end of the output shaft for driving the rear wheel.

12. The vehicle according to claim 11, and further including a reverse shaft disposed on a first side of the crankshaft together with said main shaft, the secondary shaft and said output shaft.

13. The vehicle according to claim 12, and further comprising a cam shaft disposed on a second side of said crankshaft.

14. The vehicle according to claim 13, and further comprising a balancing shaft being disposed on said second side of said crankshaft in a substantially parallel arrangement relative to said cam shaft.

15. The vehicle according to claim 13, and further comprising a chain operatively connected to said crankshaft and said cam shaft for imparting rotation thereto.

16. The vehicle according to claim 15, and further comprising a tensioner for maintaining a predetermined tension on said chain.

17. The vehicle according to claim 14, and further including a synchronizing gear train operatively connected to said crankshaft for driving said balancing shaft in a reverse direction relative to a direction of rotation of said crankshaft.

18. The vehicle according to claim 11, and further including a coupling for connecting said front drive shaft to said front end of the output shaft.

19. The vehicle according to claim 11, and further including a joint connection for connecting said rear drive shaft to said rear end of said output shaft.

20. The vehicle according to claim 11, and further comprising a front suspension connected to said frame for permitting limited swinging motion for said front wheel while maintaining a positive connection for supplying rotation from said front drive shaft to said front wheel.

21. The vehicle according to claim 11, and further comprising two front wheels driven by the front drive shaft and two rear wheels driven by the rear drive shaft.

22. The vehicle according to claim 11, and further comprising a saddle seat wherein said power unit is disposed below said saddle seat.

23. The vehicle according to claim 11, and further comprising a rear suspension connected to said frame for permitting limited swinging motion for said rear wheel while maintaining a positive connection for supplying rotation from the rear drive shaft to said rear wheel.

24. The vehicle according to claim 11, and wherein the engine has a cylinder axis tilted toward the transmission.

* * * * *